United States Patent
Kamimura et al.

(10) Patent No.: US 7,117,834 B2
(45) Date of Patent: Oct. 10, 2006

(54) AUTOMATIC CHOKE

(75) Inventors: Kenji Kamimura, Saitama (JP); Masashi Nakamura, Saitama (JP); Kouichi Asai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/080,434

(22) Filed: Mar. 16, 2005

(65) Prior Publication Data
US 2005/0205039 A1 Sep. 22, 2005

(30) Foreign Application Priority Data
Mar. 18, 2004 (JP) .............................. 2004-078162

(51) Int. Cl.
*F02N 17/00* (2006.01)
*F02M 1/08* (2006.01)
*F02M 1/10* (2006.01)

(52) U.S. Cl. ................................................ 123/179.18
(58) Field of Classification Search ............... 123/39.1, 123/399, 179, 18
See application file for complete search history.

(56) References Cited

U.S. PATENT DOCUMENTS

| | | | | |
|---|---|---|---|---|
| 4,200,064 A | * | 4/1980 | Engele | ........................ 123/674 |
| 4,321,902 A | * | 3/1982 | Stoltman | ..................... 123/435 |
| 4,463,723 A | * | 8/1984 | Tansuwan | ..................... 123/438 |
| 4,524,742 A | * | 6/1985 | Bonfiglioli et al. | ......... 123/438 |
| 4,623,322 A | * | 11/1986 | Melchior | ..................... 464/160 |

FOREIGN PATENT DOCUMENTS

JP 5-280425 10/1993

* cited by examiner

Primary Examiner—Stephen K. Cronin
Assistant Examiner—Arnold Castro
(74) Attorney, Agent, or Firm—Westerman, Hattori, Daniels & Adrian, LLP.

(57) ABSTRACT

A choke valve is controlled finely suited to the running state of an engine. A throttle valve 8 and a choke valve 9 are provided in series on an intake pipe 6, and the opening degree of the choke valve 9 is controlled by a stepping motor 11. A choke valve opening degree upon start of engine (start opening degree) is determined depending on the engine temperature. The start opening degree judging unit 27 judges whether the start opening degree is closer to the fully closed side or fully opened side. The motor initializing unit 28 initializes the stepping motor 11 at the fully closed side or the fully opened side if the start opening degree is at the fully closed side or the fully opened side, respectively. After choke release, a driving signal in a specified number of steps is issued periodically.

4 Claims, 5 Drawing Sheets

Fig. 6

| POSITION OF CHOKE VALVE UPON START OF ENGINE (NUMBER OF STEPS) | ENGINE TEMPERATURE (° C) | | | | | | | | | | | | | |
|---|---|---|---|---|---|---|---|---|---|---|---|---|---|---|
| | -25 | -20 | -15 | -10 | 0 | 10 | 20 | 30 | 40 | 50 | 60 | 70 | 80 | 80< |
| | 110 | 110 | 110 | 110 | 110 | 110 | 110 | 100 | 85 | 70 | 55 | 40 | 35 | 35 |

Fig. 7

| | \-25 | \-20 | \-15 | \-10 | 0 | 10 | 20 | 30 | 40 | 50 | 60 | 70 | 80 | 80< |
|---|---|---|---|---|---|---|---|---|---|---|---|---|---|---|
| WORKING TIME FROM START OPENING DEGREE TO HALF OPEN (sec) | 40 | 15 | 10 | 7 | 4 | 2 | 2 | 1 | 1 | 1 | — | — | — | — |
| WORKING TIME FROM HALF OPEN TO FULLY OPEN (sec) | 50 | 25 | 20 | 12 | 5 | 2 | 1 | 1 | 1 | 1 | 1 | 1 | 1 | 1 |
| TOTAL TIME UNTIL CHOKE VALVE FULLY OPENS AFTER ENGINE START (sec) | 90 | 40 | 30 | 19 | 9 | 4 | 3 | 2 | 2 | 2 | 1 | 1 | 1 | 1 |

ENGINE TEMPERATURE (°C)

AUTOMATIC CHOKE

BACKGROUND OF THE INVENTION

1. Field of the Invention

The present invention relates to an automatic choke, and more particularly to an automatic choke capable of controlling air-fuel ratio favorably corresponding to temperature in the process of engine temperature rise after starting.

2. Description of the Related Art

An automatic choke used when starting a cold engine is designed to control a solenoid actuator or diaphragm actuator for operating a choke valve according to the temperature detected by a temperature detecting element such as thermostat. When starting a cold engine, by controlling the air-fuel ratio in a direction of concentrating the mixed air by the automatic choke, the engine can be started stably.

For example, Japanese Patent Application Laid-Open No. 5-280425 relates to a case of detecting a cold engine by a sensor composed of thermistor for issuing a detection signal corresponding to the temperature of the cylinder head, and discloses an automatic choke in which the choke solenoid is automatically actuated only in cold state for actuating the choke when starting up the engine, while the throttle valve is fully closed.

As in the device disclosed in the patent document, it is general to control the choke valve by using solenoid actuator. However, since the solenoid is controlled either in on or off state, near the end of the choke period, that is, when the necessary choke period is nearly over, it tends to be over-choke (insufficient opening of choke valve).

By contrast, using a bimetal as an actuator, it has been attempted to control the choke valve continuously. However, since the bimetal is poor in response to temperature changes, the choke releasing timing is delayed both when starting a cold engine and when restarting a warm engine, thus it only consumes time while sufficient output is not obtained.

SUMMARY OF THE INVENTION

It is an object of the present invention to present an automatic choke capable of controlling the choke valve accurately and finely while following up the engine temperature.

It is an aspect of the invention to present an automatic choke for controlling the opening degree of a choke valve provided in an intake passage of the engine upon start of the engine in which it comprises a stepping motor for controlling the opening degree of the choke valve and choke control means for outputting a control signal for driving the stepping motor, wherein the choke control means issues a fully opened command for driving the choke valve to the fully opened side at a specified timing after release of choke state by the choke valve.

It is another aspect of the invention to present an automatic choke in which a fully opened command is issued periodically, the fully opened command is a signal in a specified number of steps for driving the stepping motor to the fully opened side, or the opening degree of the choke valve upon start is determined on the basis of the engine temperature, and the time until release of choke is determined on the basis of the engine temperature.

According to the invention, in the process of moving the choke valve to the choke opening position upon start of engine, or in the process of gradually releasing the choke from this position, in case out-of-tune occurs and the choke valve is not moved to the fully opened position after completion of warm-up, it can be securely moved to the fully opened position by a fully opened command issued later.

Once moved to the fully opened position, in a very rare case, if the choke valve is moved in the closing direction due to disturbance or other external factor, since the fully opened command is issued periodically, the choke valve can be securely moved to the fully opened position. This operation is realized in a very simple configuration of sending out the fully opened command periodically.

In fully opened command, only the driving signal is issued by the number of steps necessary for moving the choke valve to the fully opened side, and excessive loading of the stepping motor is suppressed.

The choke valve opening degree can be set appropriately depending on the engine temperature upon start, and the choke valve is moved gradually toward the choke release position, so that over-choke near the end of choke release can be avoided.

BRIEF DESCRIPTION OF THE DRAWINGS

FIG. 6 is a diagram showing position of the choke valve at various engine temperature levels upon start of the engine.

FIG. 7 is a diagram showing an example of a choke release time corresponding to the engine temperature.

DETAILED DESCRIPTION OF THE PREFERRED EMBODIMENTS

Figure 1:
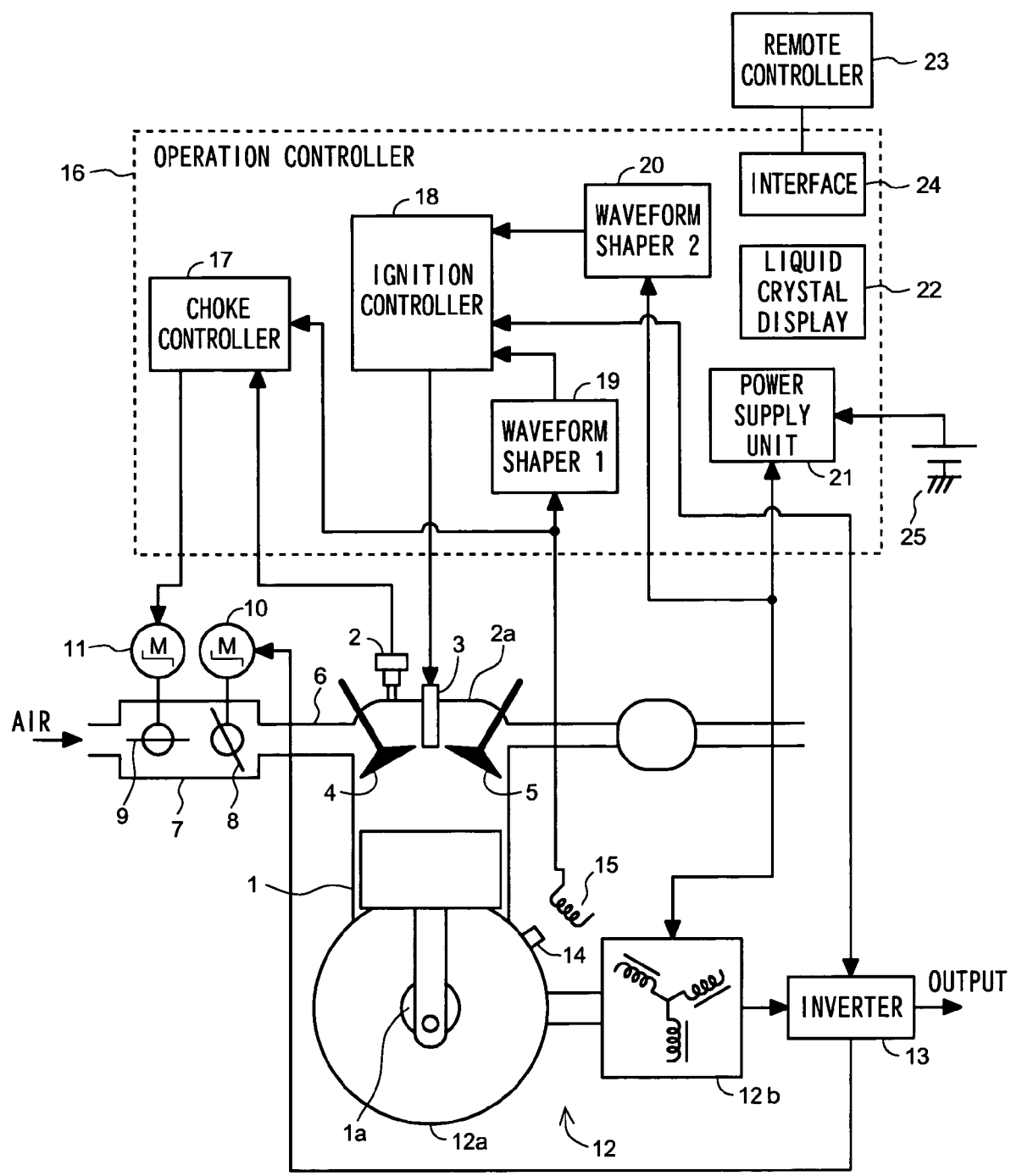
FIG. 1 is a block diagram of system configuration of an automatic choke in an embodiment of the present invention.

Referring now to the drawings, the invention is specifically described below. FIG. 1 is a block diagram of system configuration of an automatic choke in an embodiment of the present invention. In the diagram, an engine 1 is used as a driving source of a generator. The engine 1 includes a temperature sensor 2 for detecting the engine temperature. The temperature sensor 2 is provided, for example, on a cylinder head 2a. The cylinder head 2a includes an ignition plug 3, an intake valve 4, and an exhaust valve 5.

A carburetor 7 is connected to an intake tube 6 having the intake valve 4. The carburetor 7 includes a throttle valve 8 disposed at the downstream side, and a choke valve 9 disposed at its upstream. The throttle valve 8 is driven by a stepping motor 10 and opened or closed, and the choke valve 9 is driven by a stepping motor 11 and opened or closed.

The engine 1 is coupled to a generator 12. The generator 12 is driven by the engine 1, and generates alternating current. This alternating current is rectified, and converted into a specified frequency (commercial frequency of 50 or 60 Hz) by an inverter 13, and a commercial supply voltage is produced.

The generator 12 serving also as starter motor of the engine 1 comprises an outer rotor 12a having a magnet mounted on the inner circumference of a flywheel coupled to a crankshaft 1a of the engine 1, and a stator 12b on which power generating coil is wound. The crankshaft 1a may be coupled to a recoil starter (not shown) for manual starting.

The outer rotor 12a of the generator 12 includes a reluctor 14 for detection of ignition timing, and a before top dead center sensor (BTDC sensor) 15 for detecting the reluctor 14 is provided around the outer rotor 12a.

The ignition timing of the ignition plug 3 and opening degree of the choke valve 9 are controlled by an operation controller 16. A choke controller 17 outputs a control signal for driving the stepping motor 11 depending on the engine temperature detected by the temperature sensor 2 and the engine speed detected by the output of the BTDC sensor 15. According to this control signal, the stepping motor 11 operates the choke valve 9 so as to obtain an appropriate the air-fuel ratio corresponding to the temperature. The control operation of the choke controller 17 is described later.

The stepping motor 10 is controlled by an electronic governor so as to maintain the engine speed at a specified reference speed. The reference speed is variable with the magnitude of the load (the electrical load connected to the output side of the inverter 13).

An ignition controller 18 controls the ignition timing appropriately on the basis of the alternating-current waveforms of the BTDC sensor 15 and generator 12. Waveform shapers 19, 20 shape the output waveform from the BTDC sensor 15 and alternating-current output waveform from the generator 12, respectively. The ignition timing is controlled by the timing of waveform supplied from the waveform shapers 19, 20, but this is not essential point of the invention and the detail is omitted.

A power supply unit 21 supplies necessary power to the operation controller 16, and includes a battery 25, and a regulator for regulating the rectified voltage of the generator 12 (input side voltage of the inverter 13) at specified voltage. The operation controller 16 may also include a liquid crystal display 22 for displaying the running state of the generator 12 and the like. For remote control of the generator 12, an interface 24 may be provided for connection of a remote controller 23. The choke controller 17 and ignition controller 18 may be composed of microcomputers.

Figure 2:
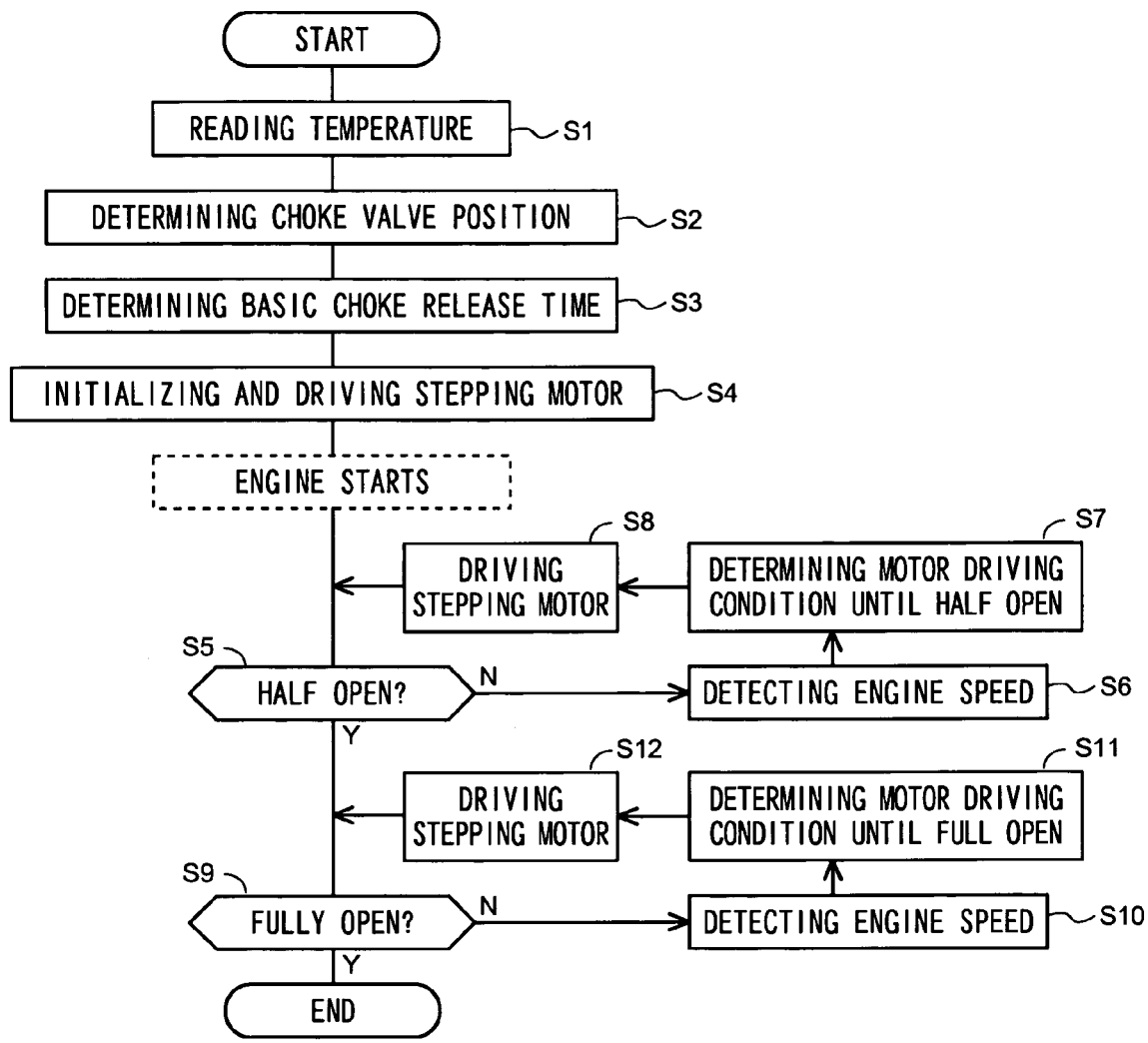
FIG. 2 is a flowchart of operation of a choke control unit.

FIG. 2 is a flowchart of operation of the choke controller 17. This process is started when the power supply unit 21 is energized by the electric power supplied from the battery 25. When the battery 25 has been over discharged, the engine 1 is turned by the recoil starter, and the power supply unit 21 is energized by the power generation output from the generator 12 at this time.

First, at step S1, the detected temperature by the temperature sensor 2 is read in. At step S2, the position of the choke valve 9 (start opening degree or start opening angle) corresponding to the detected temperature is determined. The start opening degree is read out, for example, from a predetermined table as shown in FIG. 6. The position of the choke valve 9 is indicated by the number of steps to be supplied to the stepping motor 11. The detail of FIG. 6 is described later.

At step S3, for example using a predetermined table as shown in FIG. 7, the working time until release of choke corresponding to the engine temperature (basic choke release time) is determined. The detail of FIG. 7 is described later.

At step S4, first the stepping motor 11 is driven in order to initialize, and the stepping motor 11 is driven for rotating the choke valve 9 until start opening degree.

For initialization of the stepping motor 11, for example, as described specifically below, a driving signal of a predetermined number of steps is supplied to the stepping motor 11 so as to move the choke valve 9 to the fully closed side or fully opened side. In consequence, the choke valve 9 is fully closed or fully opened. The start opening degree of the choke valve 9 is determined on the basis of this fully closed or fully opened position.

When starting up the engine by driving the starter motor by battery, after initialization of the stepping motor 11, the choke valve 9 is moved to the start opening degree, and then the engine is started. On the other hand, when power cannot be supplied from battery, since the stepping motor 11 is driven and ignited by the power generation output obtained by manual revolution by the recoil starter, driving of the choke valve 9 and start of the engine are executed almost at the same time.

After the engine startup, at step S5, it is judged whether the choke valve 9 is opened to half or not. This is judged by the number of steps of the driving signal supplied to the stepping motor 11. If the choke valve 9 is opened to less than half, advancing to step S6, the engine speed is detected. The engine speed can be detected on the basis of the output period of the BTDC sensor 15, but the method of detection is not particularly specified. At step S7, the motor driving condition until the choke valve 9 is opened to half is determined.

In determination of motor driving condition until half open, the basic choke release time determined at step S3 (working time from start opening degree to half open) is corrected. In this correction, as the engine speed is higher, the basic choke release time is shortened, and as the engine speed is lower, the basic choke release time is extended.

The number of steps of the driving signal supplied to the stepping motor 11 in every driving period (for example, 0.7 sec) is determined on the basis of this driving period and the basic choke release time extended or shortened corresponding to increase or decrease of engine speed. When the number of steps of the driving signal supplied per driving period is increased, it is fast to move to the choke release side, whereas if the number of steps supplied per driving period is decreased, it is slow to move to the choke release side.

In this way, at step S7, the number of steps of the driving signal in every driving period to be supplied to the stepping motor 11 until the choke valve 9 is opened half from start opening degree is determined, and at step S8, the stepping motor 11 is driven in the determined motor driving condition (determined number of steps).

If it is judged at step S5 that the choke valve 9 is open to half, skipping to step S9, it is judged if the choke valve 9 is fully opened or not. Same as in judgement of half open, it is determined by the number of steps supplied to the stepping motor 11.

If the choke valve 9 is not fully opened, going to step S10, the engine speed is detected. At step S11, the motor driving condition until the choke valve 9 is opened fully is determined. At step S11, too, same as at step S7, the basic choke release time by the engine speed (working time from half open to full open) is corrected, and the number of steps of the driving signal in every driving period on the stepping motor 11 is calculated. At step S12, the stepping motor 11 is driven in the determined motor driving condition (determined number of the steps). When the choke valve 9 is judged to be fully opened or the number of steps of driving signal corresponding to the fully opened position finish to be supplied, this choke control is terminated.

Figure 3:
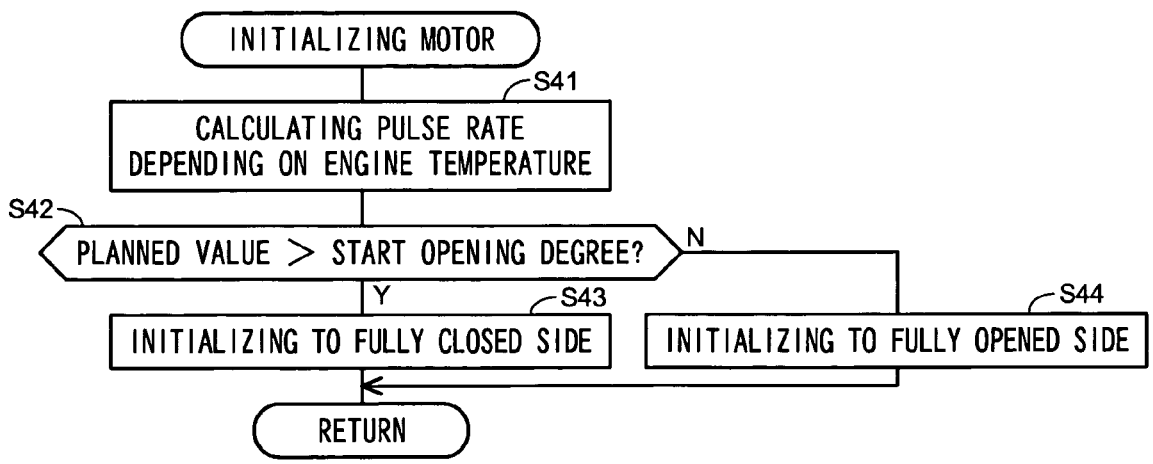
FIG. 3 is a flowchart of initializing process of a stepping motor.
Figure 4:
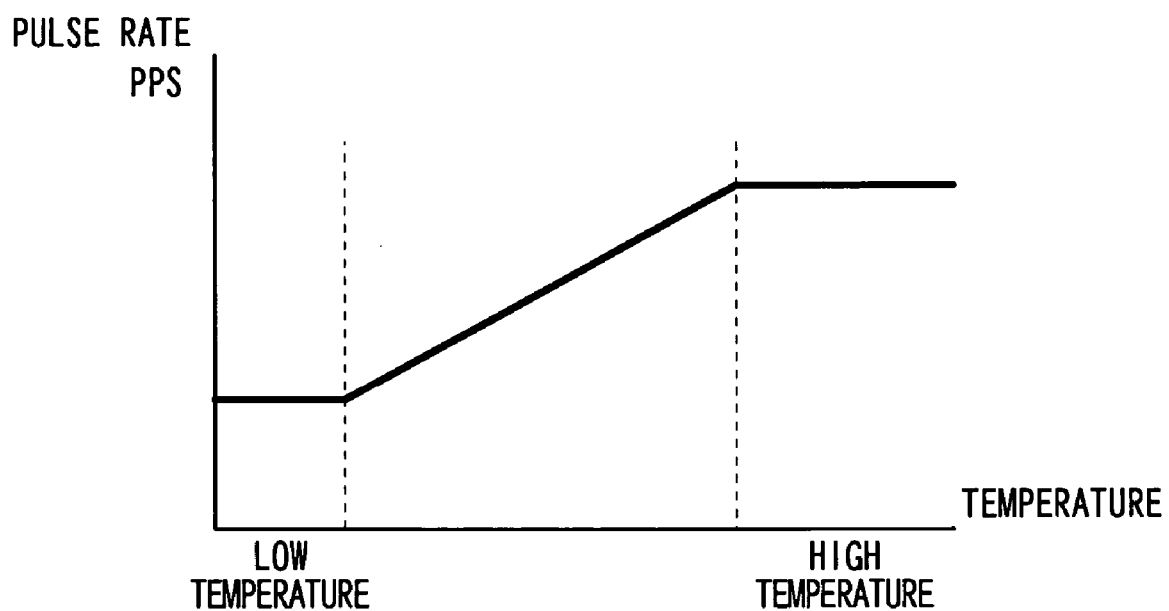
FIG. 4 is a table showing an example of pulse rate of the stepping motor corresponding to the engine temperature.

FIG. 3 is a specific flowchart of initialization (step s4) of the stepping motor 11. In the diagram, at step S41, the pulse rate of the stepping motor 11 is determined depending on the engine temperature. An example of setting table of pulse rate of the stepping motor 11 in relation to temperature is shown in FIG. 4.

At step S42, it is judged if the start opening degree determined at step S2 is less than the predicted value (for example, half open). If the start opening degree is less than half open, the process goes to step S43, and if the start opening degree is half open or more, the process goes to step S44.

At step S43, the stepping motor 11 is initialized at the fully closed side of the choke valve 9. That is, the choke valve 9 is turned to the fully closed side at the pulse rate determined at step S41. At step S44, the stepping motor 11 is initialized at the fully opened side of the choke valve 9. That is, the choke valve 9 is turned to the fully opened side at the pulse rate determined at step S41.

In this manner, when the start opening degree determined on the basis of engine temperature is at fully closed side, the choke valve 9 is driven to fully closed position, where the stepping motor 11 is initialized. On the other hand, when the start opening degree determined on the basis of the engine temperature is at fully opened side, the choke valve 9 is driven to fully opened position, where the stepping motor 11 is initialized. Thus, since initialization takes place at a side closer to the start opening degree, the choke valve 9 can be moved to the start opening degree in a shorter time after initialization.

In a stepping motor, for example, when the pulse rate is large, the rotor rotation cannot follow up the excitation, possibly falling in out-of-tune status. In this case, in the stepping motor controlled in open loop, the rotor does not rotate by a desired angle corresponding to the number of steps of the given driving signal. That is, when releasing the choke, although the driving signal by the number of steps corresponding to the fully opened position is given to the stepping motor 11, the choke valve 9 may not be fully opened due to out-of-tune or other trouble.

Accordingly, after judging that the choke valve 9 is fully opened (after output of the driving signal in the number of steps corresponding to fully opened angle), or after lapse of specified warm-up time from start of engine, new control is started (fully opened feed control) for maintaining the fully opened state periodically.

Figure 5:
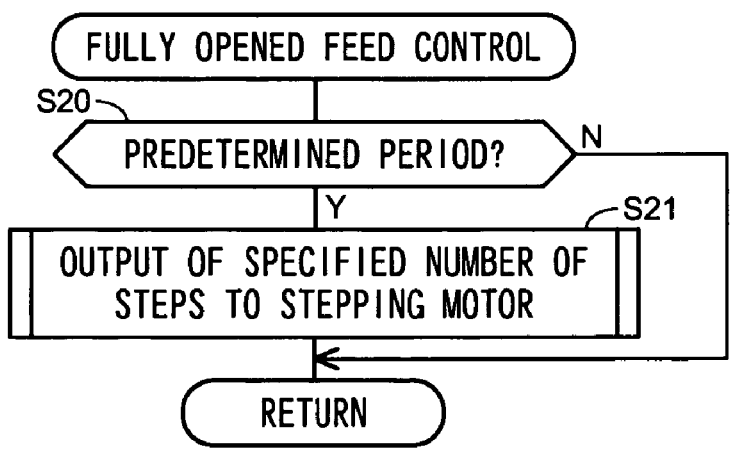
FIG. 5 is a flowchart of fully opened feed control periodically driving of the choke valve to the fully opened side.

FIG. 5 is a flowchart showing processing of essential parts of the choke controller for the fully opened feed control. At step S20, it is judged whether or not during the fully opened feed period for supplying driving signal to the stepping motor 11 in fully opened feed control. The fully opened feed period can be judged, for example, by providing the choke controller 17 with 2-second timer means, and checking if the timer means expires or not. If it is the predetermined fully opened feed period, going to step S21, a command (fully opened command) for fully opened feed is issued to the stepping motor 11. That is, a preset number of driving signals for moving the choke valve 9 to the fully opened side are sent out to the stepping motor 11. The number of driving signals for fully opened feed is, for example, 5 steps.

Fully opened feed may be executed at a specific timing after engine start, and it not limited to periodical timing.

FIG. 6 shows the position or start opening degree of the choke valve 9 at various engine temperatures upon start of engine, expressed by the number of steps of the stepping motor 11. In this example, the choke valve 9 is fully closed (number of steps=110) in an engine temperature range of minus 25° C. to 20° C., and the choke valve 9 is slightly open at engine temperature of 30° C. or higher. The choke valve 9 is half open (number of steps=55) at engine temperature of 60° C., and at higher temperatures the choke valve 9 is opened gradually up to the number of steps of 35.

As understood from this diagram, since at the engine temperature of 60° C. or less, the start opening degree is at closed side from the half open state, the stepping motor 11 is initialized at the fully closed side of the choke valve 9. Since, at the engine temperature of 60° C. or higher, the start opening degree is at opened side from the half open state, the stepping motor 11 is initialized at the fully opened side of the choke valve 9.

FIG. 7 is an example showing choke release time corresponding to the engine temperature. This is an example of basic choke release time when the engine speed is controlled by an electronic governor to be at reference speed of 3300 rpm. Therefore, if the reference speed varies with fluctuations of the load connected to the generator 12, the basic choke release time (working time until half open, and working time from half open to full open) is corrected depending on the engine speed. That is, when the load increases and the engine speed changes somewhat higher than the reference speed, the choke release time is shortened, and when the load decreases and the engine speed changes somewhat lower than the reference speed, the choke release time is extended. Thus, the choke release time is corrected to be appropriate depending on the running condition of the generator 12, that is, the engine 1.

In this embodiment, the stepping motor is used as the driving source of the choke valve, but not limited to the stepping motor, for example, a servo motor may be similarly used.

The engine temperature is represented by the temperature of the cylinder head 2a, but the engine temperature for choke valve control is not limited to the temperature at this position. For example, a temperature sensor may be installed in an oil pan or water jacket for engine cooling water, and the temperature of lubricating oil or temperature of engine cooling water may be detected, and used as engine temperature. Besides, any temperature information detected in engine case parts capable of representing the engine temperature may be employed in the choke valve control of the invention.

What is claimed is:

1. An automatic choke for controlling the opening degree of a choke valve provided in an intake passage of the engine upon start of the engine, comprising:
    a stepping motor for controlling the opening degree of the choke valve, and
    choke control means for outputting a control signal for driving the stepping motor,
    wherein the choke control means issues a fully opened command for driving the choke valve to the fully opened side at a specified timing even after outputting said control signal for release of choke state.

2. The automatic choke of claim 1, wherein the fully opened command is issued periodically.

3. The automatic choke of claim 1, wherein the fully opened command is a signal in a specified number of steps for driving the stepping motor to the fully opened side.

4. The automatic choke of claim 1, wherein the opening degree of the choke valve upon start is determined on the basis of the engine temperature, and the predetermined duration of said choke period is determined on the basis of the engine temperature.

* * * * *